US 8,478,334 B2

(12) United States Patent
Iwai et al.

(10) Patent No.: US 8,478,334 B2
(45) Date of Patent: Jul. 2, 2013

(54) WIRELESS TERMINAL DEVICE

(75) Inventors: Kenji Iwai, Kawasaki (JP); Kazushige Kishigami, Kawasaki (JP); Atsushi Kudou, Kawasaki (JP); Masahiko Hirao, Kawasaki (JP); Nobuhide Hachiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 13/354,494

(22) Filed: Jan. 20, 2012

(65) Prior Publication Data
US 2012/0238224 A1   Sep. 20, 2012

(30) Foreign Application Priority Data
Mar. 18, 2011   (JP) ................... 2011-061763

(51) Int. Cl.
*H04M 1/00*   (2006.01)
(52) U.S. Cl.
USPC ............... 455/550.1; 455/127.1; 455/129; 455/574
(58) Field of Classification Search
USPC .......... 455/90.3, 107, 118–121, 127.1, 127.5, 455/128, 129, 232, 550.1, 552.1, 553.1, 572, 455/574, 575.1, 575.5
See application file for complete search history.

(56) References Cited

U.S. PATENT DOCUMENTS

| 5,777,530 | A | 7/1998 | Nakatuka | |
| 5,822,684 | A * | 10/1998 | Kitakubo | 455/78 |
| 6,329,880 | B2 * | 12/2001 | Akiya | 330/298 |
| 6,998,912 | B2 | 2/2006 | Kushitani et al. | |
| 7,512,386 | B2 * | 3/2009 | Kalajo et al. | 455/127.1 |
| 8,064,854 | B2 * | 11/2011 | Yoshida et al. | 455/127.1 |
| 8,335,479 | B2 * | 12/2012 | Koya et al. | 455/78 |

FOREIGN PATENT DOCUMENTS

| JP | 09-270659 A | 10/1997 |
| JP | 2003-087149 A | 3/2003 |
| JP | 2008-244723 A | 10/2008 |

* cited by examiner

*Primary Examiner* — Nhan Le
(74) *Attorney, Agent, or Firm* — Fujitsu Patent Center

(57) ABSTRACT

A first casing and a second casing movably connected to the first casing are provided. PAs amplify a transmit signal. FET switches are provided between the ground and respective transmission paths connecting the PAs and an antenna. When an intermediate voltage is applied, the FET switch has a capacitance according to the applied intermediate voltage. An open or close detection unit acquires the impedance of the antenna corresponding to the positional relationship of the first casing and the second casing. A control unit turns one of a plurality of switches ON and applies the intermediate voltage to the FET switches to achieve a capacitance whereby the impedance of the PA arranged on the transmission path where the switch is ON and the impedance of the antenna are matched based on the impedance of the antenna acquired by the open or close detection unit.

6 Claims, 13 Drawing Sheets

| BAND | OPEN OR CLOSED STATE | SWITCH ON/OFF | APPLICATION VOLTAGE |
|---|---|---|---|
| BAND 1 | OPEN | SW 11: ON<br>SW 12, 13: OFF | V1(1), V2(1), V3(1) |
| BAND 1 | CLOSED | SW 11: ON<br>SW 12, 13: OFF | V1(2), V2(2), V3(2) |
| BAND 2 | OPEN | SW 12: ON<br>SW 11, 13: OFF | V1(3), V2(3), V3(3) |
| ... | ... | ... | ... |

| BAND | OPEN OR CLOSED STATE | APPLICATION VOLTAGE |
|---|---|---|
| BAND 1 | OPEN | V'1(1), V'2(1), V'3(1), V'4(1), V'5(1), V6(1) |
| BAND 1 | CLOSED | V'1(2), V'2(2), V'3(2), V'4(2), V'5(2), V'6(2) |
| BAND 2 | OPEN | V'1(3), V'2(3), V'3(3), V'4(3), V'5(3), V'6(3) |
| ... | ... | ... |

WIRELESS TERMINAL DEVICE

CROSS-REFERENCE TO RELATED APPLICATION

This application is based upon and claims the benefit of priority of the prior Japanese Patent Application No. 2011-061763, filed on Mar. 18, 2011, the entire contents of which are incorporated herein by reference.

FIELD

The embodiments discussed herein are directed to a wireless terminal device.

BACKGROUND

In recent years, there have been increasing demands for multiband or multifunctional wireless terminal devices such as mobile phones and the like. Herein, "multiband" means that wireless communication is possible using various frequency bands. Meanwhile, there have also been increasing demands to reduce the size and cost of wireless terminal devices. Therefore, there has been a demand to reduce the number of parts so as to allow many bands to be utilized and many functions to be supported with smaller number of parts.

A wireless terminal device includes a baseband (BB) unit, a power amplifier (PA), a low noise amplifier (LNA), and a duplexer (DUP). The BB unit performs modulation of a transmit signal, and demodulation of a receive signal. The PA amplifies the transmit signal. The LNA amplifies a receive signal. The DUP performs isolation receive signal from transmit and receive signal. And DUP also performs synthesis of the transmit signal and the receive signal. In a wireless terminal device which uses a plurality of bands, the numbers of BB units, PAs, LNAs, and DUPs are the same as the number of bands (frequency bands) used. In such a wireless terminal device which uses a plurality of bands, the number of antennas may be less than the number of bands used. In that case, the wireless terminal device includes a switch between antenna and some DUPs corresponding to each band. The switch connected antenna and the DUP corresponding to the band to be used. In that way, the wireless terminal device performs wireless communication using each band. In one conventional technique regarding this switch, a switch is used as an attenuator by setting a control voltage of the switch to an intermediate value.

Also, in wireless terminal devices, some cases, an isolator (ISO) is arranged between a PA and a DUP so that the PA is not influenced by a fluctuation in antenna impedance. It was caused by change in position of an antenna or the like. Since there have been increased demands to reduce the number of parts in recent years as described above, removal of the ISO has been of interest.

When an ISO is not used in a wireless terminal device, the impedance of an antenna is directly apparent as the load impedance of a PA. Therefore, the PA is influenced by the load impedance of the antenna.

In a clamshell wireless terminal device or the like, a casing can be in two states, i.e., an open state and a closed state. In such a wireless terminal device, the position of an antenna of the casing changes according to each state. Specifically, the antenna is located approximately in the center of the casing when the casing is open, whereas the antenna is located in an end portion of the casing when the casing is closed. When the position of the antenna with respect to the casing changes, the impedance of the antenna also changes. Therefore, a technique for preventing a PA from being influenced by a change in impedance of the antenna is used for a wireless terminal device without an ISO.

Conventionally, a technique has been proposed for when the impedance of an antenna varies, in which a backoff from a saturation region enables an operation region of a PA to be used with increased load stability in order to ensure the device characteristic even if the impedance varies.

Patent Document 1: Japanese Laid-open Patent Publication No. 9-270659

However, a PA with a large amount of backoff is less power-efficient and requires more quiescent current compared to a PA with a small backoff. Therefore, it has been difficult to combine high power efficiency and reducing the number of parts by not using an ISO.

SUMMARY

According to an aspect of an embodiment of the invention, a wireless terminal device includes a first casing including an antenna; a second casing movably connected to the first casing; a baseband processing unit that generates a transmit signal; a plurality of amplifiers that amplify the transmit signal; a first switch provided on each transmission path connecting the antenna and each of the amplifiers; a second switch provided between the transmission path and a ground, where the second switch is turned ON when a first predetermined voltage is applied, is turned OFF when a second predetermined voltage is applied, and, when an intermediate voltage between the first predetermined voltage and the second predetermined voltage is applied, has a capacitance according to the applied intermediate voltage; an impedance acquisition unit that acquires an impedance of the antenna corresponding to a positional relationship of the first casing and the second casing; and a control unit that turns ON one of the first switches based on a frequency band of the transmit signal and applies the intermediate voltage to at least one of the second switches to match an impedance of the amplifier arranged on the transmission path where the first switch is turned ON and the impedance of the antenna based on the impedance of the antenna acquired by the impedance acquisition unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a view of one example of a setting information table of the mobile phone according to the first embodiment;

FIG. 9 is a view of one example of a setting information table of the mobile phone according to the second embodiment;

DESCRIPTION OF EMBODIMENTS

Preferred embodiments of the present invention will be explained with reference to accompanying drawings.

Note that the wireless terminal device disclosed in the present application is not limited to the embodiments below. Also, the wireless terminal device is not limited to a mobile phone, which is given as an example in the description below, as long as the wireless terminal device has a wireless communication function.

[a] First Embodiment

Figure 1:
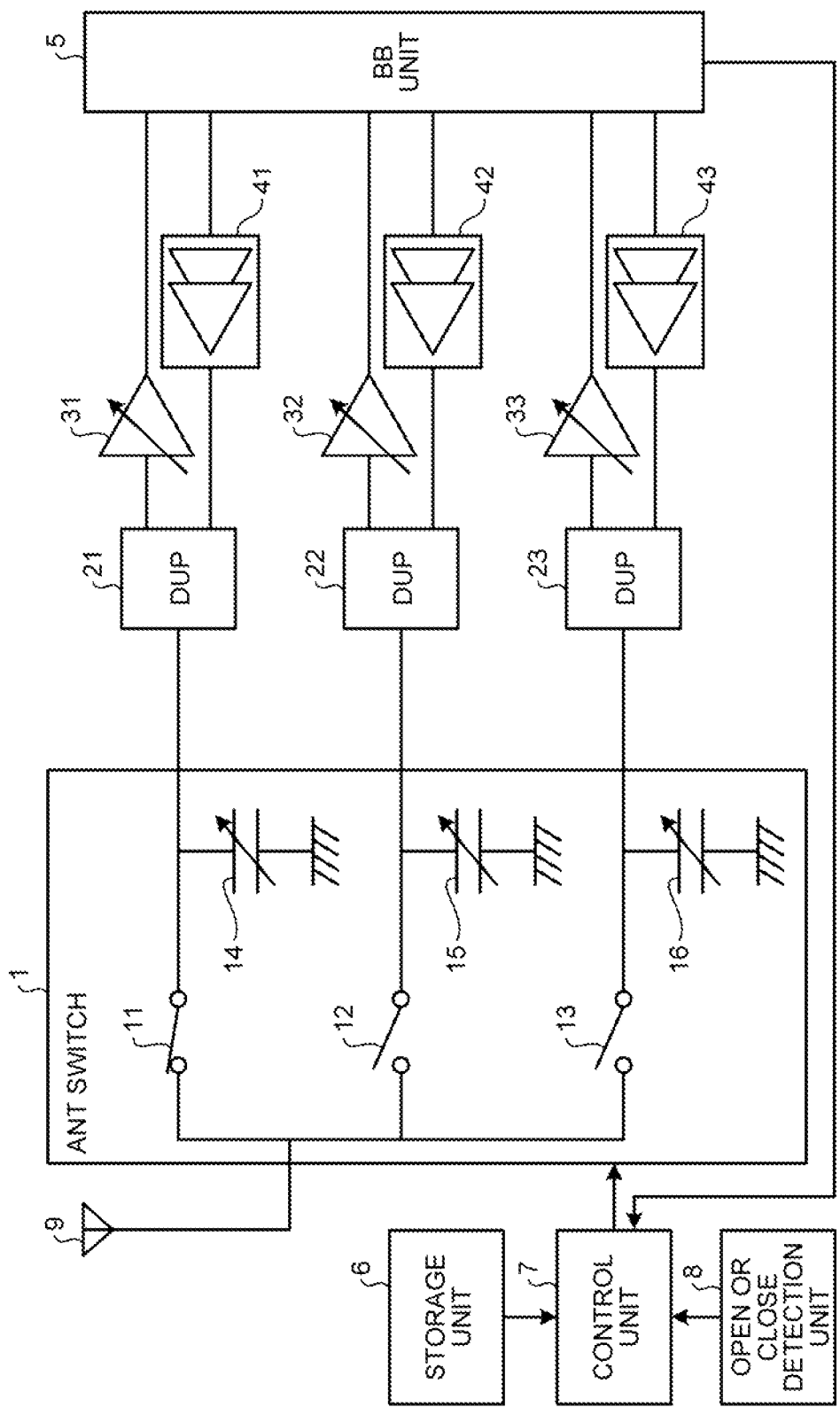
FIG. 1 is a block diagram of a mobile phone according to a first embodiment.

FIG. 1 is a block diagram of a mobile phone according to a first embodiment. As depicted as FIG. 1, the mobile phone according to this embodiment includes an antenna (ANT) switch 1, DUPs 21 to 23, LNAs 31 to 33, PAs 41 to 43, a BB unit 5, a storage unit 6, a control unit 7, an open or close detection unit 8, and an antenna 9.

The ANT switch 1 includes switches 11 to 13 and FET (Field Effect Transistor) switches 14 to 16.

The switch 11 is arranged on a signal transmission path which connects the antenna 9 with the LNA 31 and the PA 41 via the DUP 21. In this embodiment, the switch 11 is provided between the antenna 9 and the DUP 21. When the first frequency band of a signal to be transmitted or received is used, the switch 11 is turned ON. When the second or third frequency band of the signal to be transmitted or received is used, the switch 11 is turned OFF. That is, the transmission path on which the switch 11 is arranged is used for transmitting or receiving a first band signal. The first band signal is hereinafter referred to as Band 1. Also, a second band signal is referred to as Band 2. Also, a third band signal is referred to as Band 3.

The switch 12 is arranged on a signal transmission path which connects the antenna 9 with the LNA 32 and the PA 42 via the DUP 22. In this embodiment, the switch 12 is provided between the antenna 9 and the DUP 22. When the Band 2 is to be transmitted or received, the switch 12 is turned ON. When the Band 1 or the Band 3 is to be transmitted or received, the switch 12 is turned OFF. That is, the transmission path on which the switch 12 is arranged is used for transmitting or receiving the Band 2.

The switch 13 is arranged on a signal transmission path which connects the antenna 9 with the LNA 33 and the PA 43 via the DUP 23. In this embodiment, the switch 13 is provided between the antenna 9 and the DUP 23. When the Band 3 is to be transmitted or received, the switch 13 is turned ON. When the Band 1 or the Band 2 is to be transmitted or received, the switch 13 is turned OFF. That is, the transmission path on which the switch 13 is arranged is used for transmitting or receiving the Band 3. The switches 11 to 13 exemplify a "first switch."

The FET switch 14 is a switch arranged on a path connecting the signal transmission path, which connects the antenna 9 and the PA 41, with the ground. That is, when the FET switch 14 is ON, the transmission path connecting the antenna 9 and the PA 41 is held at a reference voltage. In this embodiment, the FET switch 14 is arranged between the switch 11 and the DUP 21.

The FET switch 14 is, for example, a switch that is turned OFF when a input voltage of −3 V or less is applied and turned ON when a voltage of −0.8 V or greater is applied. When an intermediate voltage between −0.8 V and −3 V is applied, the FET switch 14 has a capacitance. That is, when the intermediate voltage between −0.8 V and −3 V (hereinafter simply referred to as "intermediate voltage") is applied, the FET switch 14 acts as a capacitor.

Figure 2:
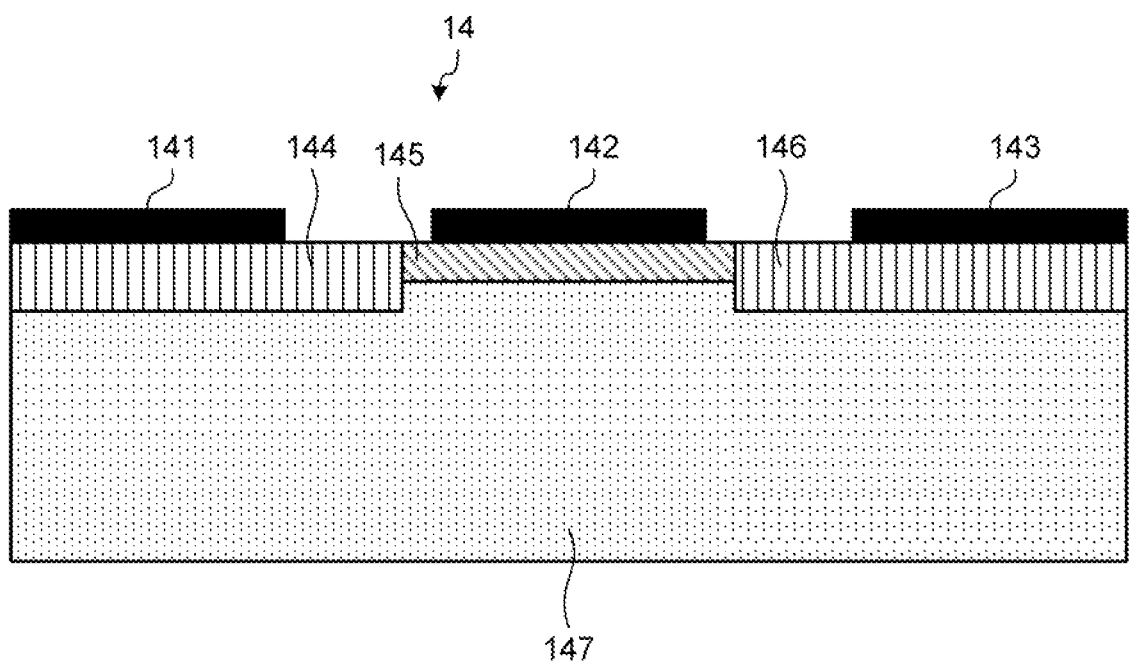
FIG. 2 is a schematic view of an FET switch.

Referring to FIG. 2, one example of the FET switch 14 will be described specifically. FIG. 2 is a schematic view of the FET switch.

The FET switch 14 includes a drain terminal 141, a gate terminal 142, a source terminal 143, a drain semiconductor 144, a depletion layer 145, a source semiconductor 146, and a substrate 147.

By applying a voltage to the gate terminal 142, the thickness of the depletion layer 145 is changed. The drain terminal 141, the drain semiconductor 144, the depletion layer 145, the source terminal 143, and the source semiconductor 146 become a capacitor of which the capacitance is determined by the thickness of the depletion layer 145.

When the capacitance is sufficiently small, i.e., when the depletion layer 145 is sufficiently large, the drain semiconductor 144 and the source semiconductor 146 are electrically isolated. Accordingly, a signal is not exchanged between the source terminal 143 and the drain terminal 141. That is, the FET switch 14 is in an OFF state. When the capacitance is sufficiently large, i.e., when the depletion layer 145 is sufficiently small, the drain semiconductor 144 and the source semiconductor 146 are electrically connected. Accordingly, a signal is exchanged between the source terminal 143 and the drain terminal 141. That is, the FET switch 14 is in an ON state. The FET switch 14 is a depletion-type FET (DFET) which is turned ON in a state where a voltage of 0 V is applied to the gate terminal 142. That is, when 0 V is applied to the gate terminal 142, the capacitance becomes sufficiently large to turn the FET switch 14 ON. The FET switch 14 is turned ON when a voltage of −0.8 V or greater is applied to the gate terminal 142. When a voltage of −3 V, which is a threshold voltage, or less is applied to the gate terminal 142, the capacitance becomes sufficiently small to turn the FET switch 14 OFF.

When the intermediate voltage greater than −3 V and less than −0.8 V is applied to the gate terminal 142, the FET switch 14 is in an intermediate state between ON and OFF. In this case, the FET switch 14 acts as a capacitor. By changing the intermediate voltage, the capacitance of the FET switch 14 is changed.

The intermediate voltage is applied under control of the control unit 7, which will be described later, to the FET switch 14, which then acts as a capacitor having a predetermined capacitance.

The FET switch 15 is a switch arranged on a path connecting the signal transmission path, which connects the antenna 9 and the PA 42, with the ground. That is, when the FET switch 15 is ON, the transmission path connecting the antenna 9 and the PA 42 is held at the reference voltage. In this embodiment, the FET switch 15 is arranged between the switch 12 and the DUP 22.

The FET switch 15 is a switch having a configuration similar to the FET switch 14. The intermediate voltage is applied under control of the control unit 7, which will be described later, to the FET switch 15, which then acts as a capacitor having a predetermined capacitance.

The FET switch 16 is a switch arranged on a path connecting the signal transmission path, which connects the antenna 9 and the PA 43, with the ground. That is, when the FET switch 16 is ON, the transmission path connecting the antenna 9 and the PA 43 is held at the reference voltage. In this embodiment, the FET switch 16 is arranged between the switch 13 and the DUP 23.

The FET switch 16 is a switch having a configuration similar to the FET switch 14. The intermediate voltage is applied under control of the control unit 7, which will be described later, to the FET switch 16, which then acts as a capacitor having a predetermined capacitance. The FET switches 14 to 16 exemplify a "second switch."

Figure 3:
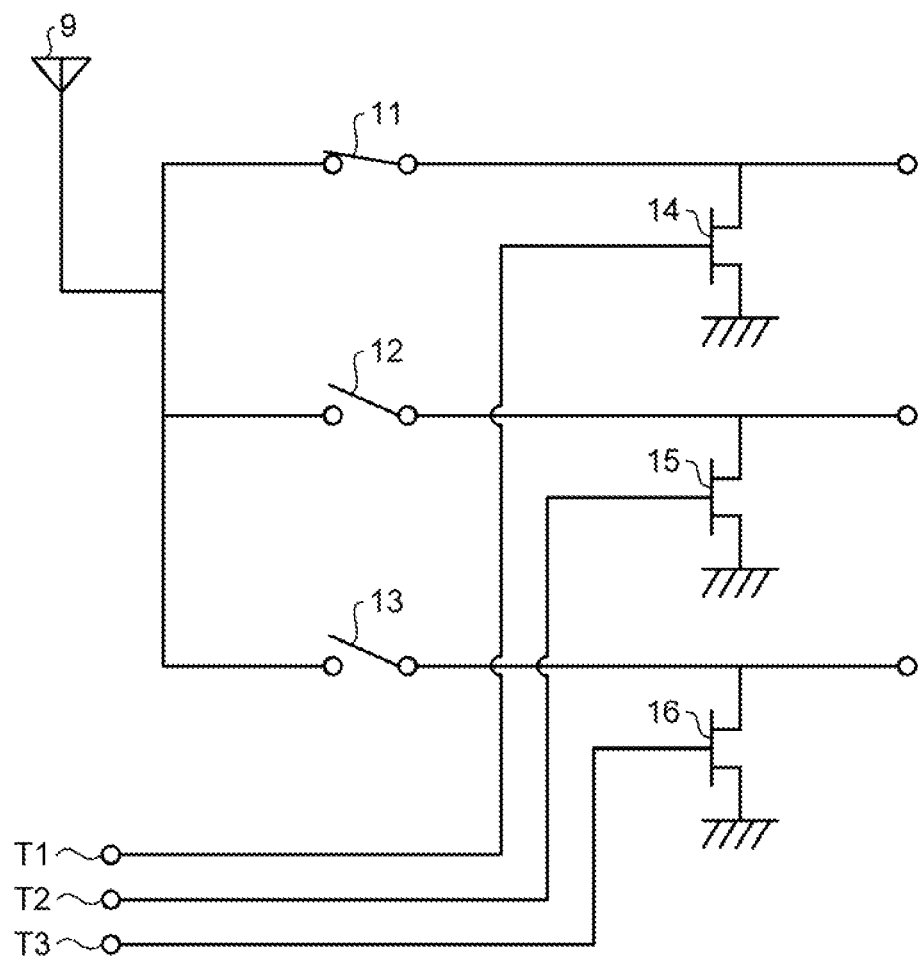
FIG. 3 is a view depicting a circuit example of an ANT switch unit of the mobile phone according to the first embodiment.

FIG. 3 is a view depicting a circuit example of an ANT switch unit of the mobile phone according to the first embodiment. A terminal T1 is connected to the gate terminal of the FET switch 14. A terminal T2 is connected to a gate terminal of the FET switch 15. A terminal T3 is connected to a gate terminal of the FET switch 16. The terminals T1 to T3 can be applied with different voltages, respectively. Accordingly, different gate voltages can be applied to the FET switches 14 to 16, respectively.

The DUP 21 performs isolation and synthesis of a Band 1 signal as a transmit or receive signal. The DUP 21 is a duplexer for sharing the one antenna 9 in transmitting or receiving the Band 1 signal. The DUP 21 receives input of an amplified transmit signal from the PA 41, which will be described later. Then, when the switch 11 is ON, the DUP 21 transmits the transmit signal to an external device via the antenna 9. Also, when the switch 11 is ON, the DUP 21 receives input of a receive signal from the antenna 9. Then, the DUP 21 outputs the receive signal to the LNA 31.

The DUP 22 performs isolation and synthesis of a Band 2 signal as a transmit or receive signal. The DUP 22 is a duplexer for sharing the one antenna 9 in transmitting or receiving the Band 2 signal. The DUP 22 receives input of an amplified transmit signal from the PA 42, which will be described later. Then, when the switch 12 is ON, the DUP 22 transmits the transmit signal to an external device via the antenna 9. Also, when the switch 12 is ON, the DUP 22 receives input of a receive signal from the antenna 9. Then, the DUP 22 outputs the receive signal to the LNA 32.

The DUP 23 performs isolation and synthesis of a Band 3 signal as a transmit or receive signal. The DUP 23 is a duplexer for sharing the one antenna 9 in transmitting or receiving the Band 3 signal. The DUP 23 receives input of an amplified transmit signal from the PA 43, which will be described later. Then, when the switch 13 is ON, the DUP 23 transmits the transmit signal to an external device via the antenna 9. Also, when the switch 13 is ON, the DUP 23 receives input of a receive signal from the antenna 9. Then, the DUP 23 outputs the receive signal to the LNA 33.

The LNA 31 receives input of the receive signal from the DUP 21. Then, the LNA 31 amplifies the receive signal. Then, the LNA 31 outputs the amplified receive signal to the BB unit 5.

The LNA 32 receives input of the receive signal from the DUP 22. Then, the LNA 32 amplifies the receive signal. Then, the LNA 32 outputs the amplified receive signal to the BB unit 5.

The LNA 33 receives input of the receive signal from the DUP 23. Then, the LNA 33 amplifies the receive signal. Then, the LNA 33 outputs the amplified receive signal to the BB unit 5.

The PA 41 receives input of the transmit signal from the BB unit 5. Then, the PA 41 amplifies the received transmit signal. Then, the PA 41 outputs the amplified transmit signal to the DUP 21. Through adjustment of the capacitance of the FET switches 14 to 16 in the ANT switch 1, the impedance of the antenna 9 and the output of the PA 41 are matched. Therefore, the PA 41 can perform amplification with high performance regardless of the impedance of the antenna 9. Herein, a high performance of an amplifier refers to a performance adjusted to maximize the gain of the amplifier in consideration of the power, distortion, voltage, or the like.

The PA 42 receives input of the transmit signal from the BB unit 5. Then, the PA 42 amplifies the received transmit signal. Then, the PA 42 outputs the amplified transmit signal to the DUP 22. Through adjustment of the capacitance of the FET switches 14 to 16 in the ANT switch 1, the impedance of the antenna 9 and the output of the PA 42 are matched. Therefore, the PA 42 can perform amplification with high performance regardless of the impedance of the antenna 9.

The PA 43 receives input of the transmit signal from the BB unit 5. Then, the PA 43 amplifies the received transmit signal. Then, the PA 43 outputs the amplified transmit signal to the DUP 23. Through adjustment of the capacitance of the FET switches 14 to 16 in the ANT switch 1, the impedance of the antenna 9 and the output of the PA 43 are matched. Therefore, the PA 43 can perform amplification with high performance regardless of the impedance of the antenna. The PAs 41 to 43 exemplify an "amplifier."

The BB unit 5 modulates a signal input by an operator and generates a baseband signal as the transmit signal. Then, the BB unit 5 determines from the frequency of the transmit signal which one of the PAs 41 to 43 the transmit signal is to be amplified at. Then, the BB unit 5 outputs the generated transmit signal to the determined amplifier. Also, the BB unit 5 outputs band information of the transmit signal to the control unit 7.

Also, the BB unit 5 receives input of the receive signal from the LNAs 31 to 33. Then, the BB unit 5 demodulates the received signal and provides information of the demodulated signal to the operator by using a display unit, speaker, or the like. The BB unit 5 exemplifies a "baseband processing unit."

The storage unit 6 is a storage device such as a memory or a hard disk. In this embodiment, the storage unit 6 stores in advance a setting information table 200 which describes whether the switches 11 to 13 are to be ON or OFF and the voltage to be applied to the FET switches 14 to 16 for each combination of the band and the open or closed state of the mobile phone, as illustrated in FIG. 4. FIG. 4 is a view of one example of the setting information table of the mobile phone according to the first embodiment.

As illustrated in FIG. 4, items provided in the setting information table 200 are band, open or closed state, switch ON or OFF, and application voltage. A column for band in the setting information table 200 describes the band information of the transmit signal. Also, a column for open or closed state in the setting information table 200 describes whether the mobile phone is in an open state or a closed state. The impedance of the antenna 9 differs depending on whether the mobile phone is in an open state or a closed state. Therefore, discerning the open or closed state of the mobile phone enables the impedance of the antenna 9 at the time to be specified. That is, the open or closed state of the mobile phone in the setting information table 200 represents the impedance of the antenna 9. A column for switch ON or OFF in the setting information table 200 describes the ON or OFF state of the switches 11 to 13 for each band of the transmit signal. Herein, SW in the setting information table 200 represents a switch. Further, a column for application voltage in the setting information table 200 describes the voltage to be applied to the FET switches 14 to 16 for each combination of the band of the transmit signal and the open or closed state. In other words, the column for application voltage in the setting information table 200 describes the application voltage of the FET switches 14 to 16 for each combination of the band of the transmit signal and the impedance of the antenna 9. That is, as long as the band information of the transmit signal and the open or closed state of the mobile phone are specified, whether the switches 11 to 13 are to be ON or OFF and the application voltage of the FET switches 14 to 16 are specified for each case by using the setting information table 200.

As an example, a case where the transmit signal is Band 1 and the mobile phone is in a closed state will be described. In this case, the corresponding ON or OFF states of the switches 11 to 13 are ON for the switch 11 and OFF for the switch 12 and the switch 13. This is because when the transmit signal is Band 1, the transmit signal is amplified by the PA 41, and the amplified transmit signal is transmitted from the antenna 9. The corresponding application voltages of the FET switches 14 to 16 in this case are V1(2) to V3(2), respectively. In this case, the switch 11 is ON, and the transmit signal amplified by the PA 41 is transmitted from the antenna 9 via the DUP 21 and the switch 11. The voltages V1(2), V2(2), and V3(2) are determined such that, when applied, the capacitance of the FET switches 14 to 16 causes the impedance of the antenna 9 and the output of the PA 41 to be matched. In other words, when the load impedance of the transmission path connecting the antenna 9 and the PA 41 is described in a Smith chart, the capacitance of the FET switches 14 to 16 is determined such that the described impedance approaches a center portion of the Smith chart. The determined capacitance of the FET switches 14 to 16 is achieved at the voltages V1(2), V2(2), and V3(2). When the switch 11 is ON, the FET switch 14 has a dominant influence on the impedance of the antenna 9. Thus, the capacitance of the FET switch 14 is mainly adjusted. The FET switch 15 and the FET switch 16 may be turned ON to be connected with the ground, so that the transmission paths connecting to the DUP 22 and the DUP 23 are held at the reference voltage.

Although the setting information table 200 in FIG. 4 describes three sets of the setting information, the setting information table 200 in reality describes the setting information in a number of sets according to the band number used and the corresponding open or closed state. Also, although the ON or OFF state and the application voltage have been described for when the transmit signal is Band 1 and the mobile phone is in a closed state, the ON or OFF state and the application voltage are determined in a similar manner also in cases where the band or the open or closed state differs.

The open or close detection unit 8 detects whether a casing of the mobile phone is in an open state or a closed state. For example, the open or close detection unit 8 is a sensor provided to a hinge mechanism to detect an angle of the hinge mechanism and thus detect the casing opening or closing according to the angle. Then, the open or close detection unit 8 outputs information on the open or closed state of the casing of the mobile phone to the control unit 7. The open or close detection unit 8 exemplifies an "impedance acquisition unit."

The control unit 7 receives the band information of the transmit signal from the BB unit 5. Also, the control unit 7 receives input on the open or closed state of the casing of the mobile phone from the open or close detection unit 8.

Then, the control unit 7 acquires whether the switches 11 to 13 are to be ON or OFF and the application voltage of the FET switches 14 to 16 to correspond to the received band information and the open or closed state. For example, when the transmit signal is Band 1 and the mobile phone is in a closed state, the control unit 7 acquires information indicating that the switch 11 is to be ON, the switch 12 and the switch 13 are to be OFF, and the application voltages for the FET switches 14 to 16 are respectively V1(2) to V3(2).

Then, the control unit 7 performs control of the switches 11 to 13 and the FET switches 14 to 16 according to the acquired information. As an example, a case where the control unit 7 has acquired the information indicating that the switch 11 is to be ON, the switch 12 and the switch 13 are to be OFF, and the application voltages for the FET switches 14 to 16 are V1(2) to V3(2), respectively, will be described. The control unit 7 turns the switch 11 ON. Accordingly, the transmit signal output from the PA 41 is transmitted via the antenna 9. Also, the control unit 7 turns the switch 12 and the switch 13 OFF. Accordingly, a signal from the DUP 22 and the DUP 23 is not passed on to the antenna 9, and a signal input from the antenna 9 is not passed on to the DUP 22 and the DUP 23. Also, the control unit 7 applies a gate voltage of V1(2) to the FET switch 14, which then acts a capacitor having a predetermined capacitance. Also, the control unit 7 applies a gate voltage of V2(2) to the FET switch 15, which then acts a capacitor having a predetermined capacitance. Also, the control unit 7 applies a gate voltage of V3(2) to the FET switch 16, which then acts a capacitor having a predetermined capacitance. Accordingly, the impedance of the antenna 9 and the output impedance of the PA 41 are matched. In other words, when the load impedance of the transmission path connecting the antenna 9 and the PA 41 is described in a Smith chart, the described load impedance is near a center portion of the Smith chart.

It has been described that, in all of the combinations of the band of the transmit signal and the open or closed state, the impedance of the antenna 9 and the output impedance of the amplifier, among the PAs 41 to 43, which amplifies the transmit signal are matched by adjusting the application voltage for the FET switches 14 to 16. Note that, in all of the combinations of the band of the transmit signal and the open or closed state, the FET switch not arranged on the transmission path of the transmit signal does not need to be used as a capacitor. For example, there are cases where a PA is designed in advance to match the antenna impedance and the impedance of the PA in an open state. In that case, it is not requested in the open state to match the impedances using an FET switch as a capacitor. Thus, it may be such that, in an open state, an FET switch arranged on a transmission path of a transmit signal is simply turned OFF and another FET switch turned ON.

Figure 5:
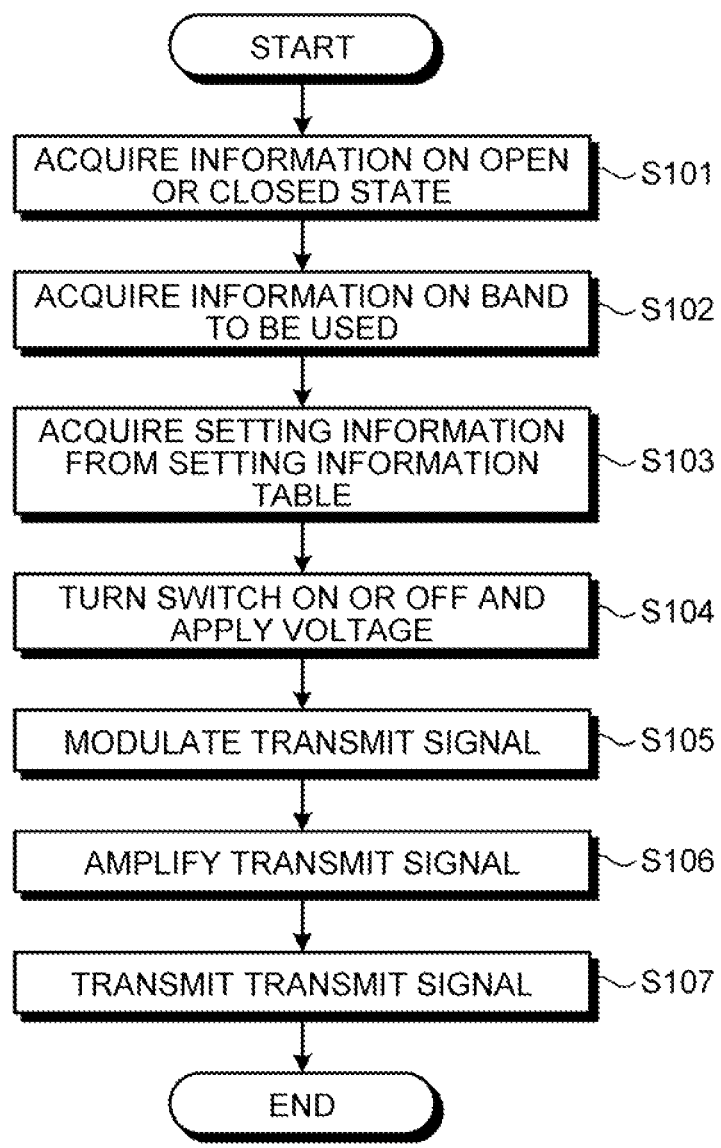
FIG. 5 is a flowchart of a signal transmission process of the mobile phone according to the first embodiment.

Next, referring to FIG. 5, the flow of a signal transmission process of the mobile phone according to this embodiment will be described. FIG. 5 is a flowchart of the signal transmission process of the mobile phone according to the first embodiment.

The control unit 7 acquires information on the open or closed state of the mobile phone detected by the open or close detection unit 8 (step S101).

Next, the control unit 7 acquires information on the band of the signal used as the transmit signal from the BB unit 5 (step S102).

Then, the control unit 7 acquires the setting information which is information on whether the switches 11 to 13 are to be ON or OFF and information on the application voltage of the FET switches 14 to 16 corresponding to the information on the open or closed state and the band information (step S103).

The control unit 7 controls the switches 11 to 13 to be ON or OFF according to the acquired setting information. Further, the control unit 7 applies voltages to the FET switches 14 to 16 according to the acquired setting information (step S104).

The BB unit 5 modulates the signal input by the operator (step S105).

The amplifier, among the PAs 41 to 43, corresponding to the band of the transmit signal receives input of the modulated transmit signal from the BB unit 5. Then, the amplifier which has received the input of the transmit signal amplifies the transmit signal (step S106).

Then, the amplified transmit signal is transmitted from the antenna 9 (step S107).

Figure 6:
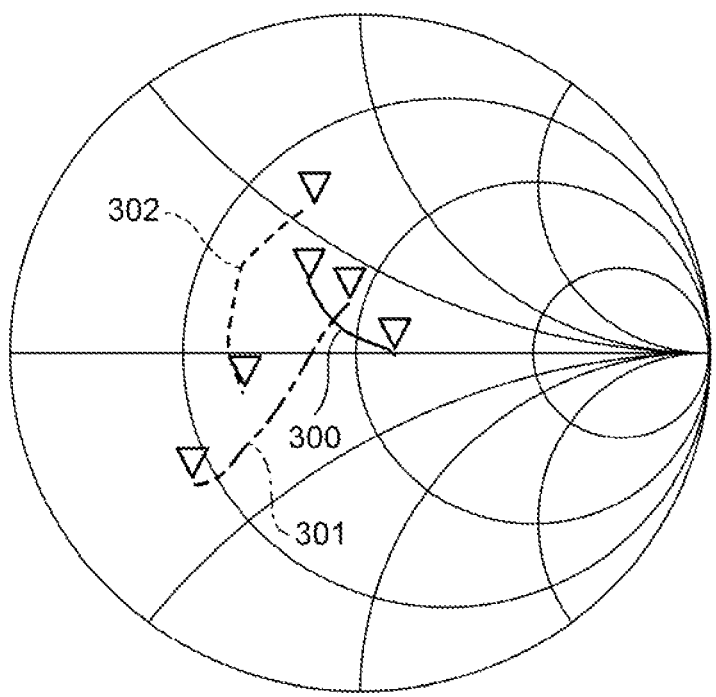
FIG. 6 is a Smith chart for illustrating the change in load impedance in the mobile phone according to the first embodiment.

Referring to FIG. 6, the change in load impedance in the mobile phone according to this embodiment will be described. FIG. 6 is a Smith chart for illustrating the change in load impedance in the mobile phone according to the first embodiment. Herein, a case where the mobile phone is designed to match impedances in an open state will be described.

A solid line 300 describes the impedance of the transmission path of the mobile phone in an open state when an ISO is simply removed and impedance matching is not performed. Specifically, the load impedance of the transmission path connecting the amplifier, among the PAs 41 to 43, corresponding to each band and the antenna in a state where the mobile phone is open is obtained for each band and connected as the solid line 300.

Since the mobile phone is designed to match impedances in an open state, the solid line 300 is near the center in the Smith chart. Thus, it is not requested to perform impedance matching in an open state. Therefore, impedance matching using the FET switch as a capacitor is not performed in the mobile phone according to this embodiment as well. That is, the solid line 300 also represents the impedance of the transmission path of the mobile phone according to this embodiment in an open state.

In contrast, a dashed line 302 describes the impedance of the transmission path of the mobile phone in a closed state when an ISO is simply removed and impedance matching is not performed. Specifically, the load impedance of the transmission path connecting the amplifier, among the PAs 41 to 43, corresponding to each band and the antenna in a state where the mobile phone is closed is obtained for each band and connected as the dashed line 302.

The dashed line 302 extends greatly upward in the Smith chart when seen from the front, and the load impedance greatly fluctuates depending on the frequency. At this rate, distortion due to the amplification by the amplifier increases depending on the used frequency, thereby deteriorating the signal. Thus, in this case, it is preferable to perform impedance matching. In this case, the impedance can be changed in a direction from the upper left toward the lower right in the Smith chart when seen from the front by inserting an FET switch that acts as a capacitor between the transmission path and the ground. That is, by using the mobile phone according to this embodiment, the dashed line 302 illustrating the impedance can be moved in a direction from the upper left toward the lower right in the Smith chart when seen from the front.

A dashed-dotted line 301 describes the impedance of the transmission path of the mobile phone according to this embodiment in a closed state. Specifically, the load impedance of the transmission path connecting the amplifier, among the PAs 41 to 43, corresponding to each band and the antenna in a state where the mobile phone according to this embodiment is closed is obtained for each band and connected as the dashed-dotted line 301.

The dashed-dotted line 301 is closer to the center of the Smith chart than the dashed line 302. That is, the load impedance is more stable in the mobile phone according to this embodiment compared to the mobile phone from which an ISO is simply removed and which does not perform impedance matching.

By using the FET switches 14 to 16 as a capacitor connecting the transmission path and the ground in this manner, the mobile phone according to this embodiment can improve the load impedance when the impedance of the antenna has changed.

As described above, the wireless terminal device according to this embodiment can match the impedance of the antenna and the impedance of the PA by using the antenna switch as a capacitor. Accordingly, the PA can be prevented from being influenced by a change in impedance of the antenna without providing an isolator between the PA and the antenna. Thus, the number of parts can be reduced without having to decrease power efficiency.

[b] Second Embodiment

Figure 7:
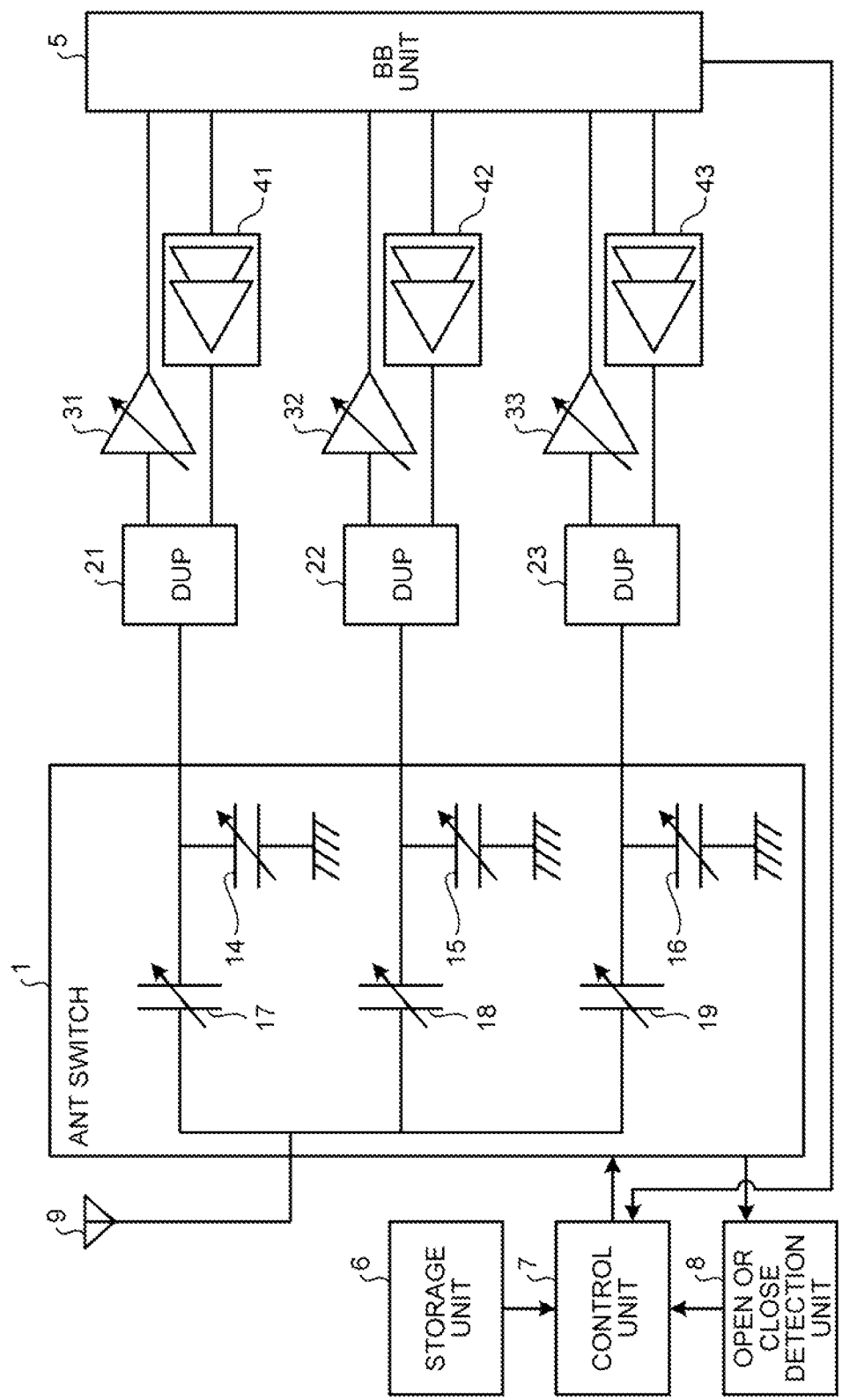
FIG. 7 is a block diagram of a mobile phone according to a second embodiment.

FIG. 7 is a block diagram of a mobile phone according to a second embodiment. In the mobile phone according to this embodiment, the switches 11 to 13 in the mobile phone in the first embodiment are replaced by FET switches. In FIG. 7, respective portions denoted by the same reference numerals as those in FIG. 1 have the same functions, unless described otherwise.

As depicted in FIG. 7, the ANT switch 1 of the mobile phone according to this embodiment includes FET switches 14 to 19.

The FET switch 17 is arranged on a signal transmission path which connects the antenna 9 with the LNA 31 and the PA 41 via the DUP 21. In this embodiment, the FET switch 17 is provided between the antenna 9 and the DUP 21.

The FET switch 17 is a switch having a configuration similar to the FET switch 14. When a transmit signal is Band 1, a voltage of −0.8 V or greater is applied under control of the control unit 7 to turn the FET switch 17 ON. When the transmit signal is Band 2 or Band 3, the intermediate voltage is applied under control of the control unit 7 to the FET switch 17, which then acts as a capacitor having a predetermined capacitance.

The FET switch 18 is a switch having a configuration similar to the FET switch 14. When a transmit signal is Band 2, a voltage of −0.8 V or greater is applied under control of the control unit 7 to turn the FET switch 18 ON. When the transmit signal is Band 1 or Band 3, the intermediate voltage is applied under control of the control unit 7 to the FET switch 18, which then acts as a capacitor having a predetermined capacitance.

The FET switch 19 is a switch having a configuration similar to the FET switch 14. When the transmit signal is Band 3, a voltage of −0.8 V or greater is applied under control of the control unit 7 to turn the FET switch 19 ON. When the transmit signal is Band 1 or Band 2, the intermediate voltage is applied under control of the control unit 7 to the FET switch 19, which then acts as a capacitor having a predetermined capacitance. The FET switches 17 to 19 exemplify the "first switch."

Figure 8:
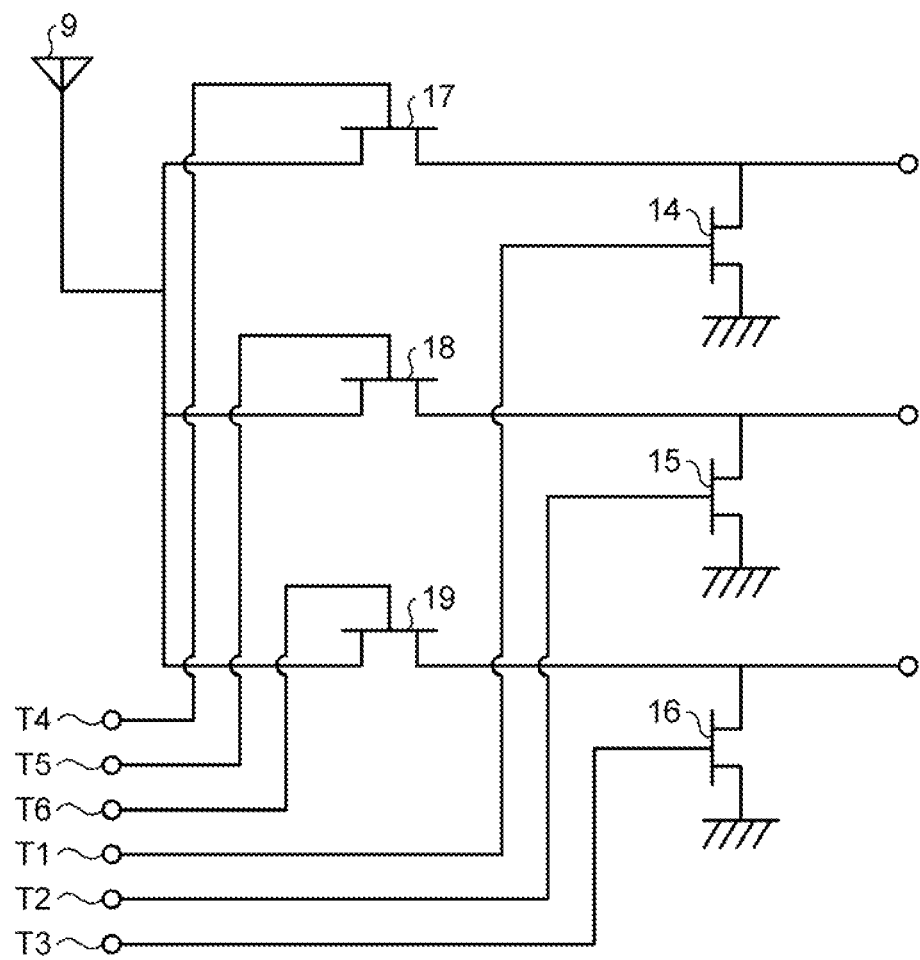
FIG. 8 is view depicting a circuit example of an ANT switch unit of the mobile phone according to the second embodiment.

FIG. 8 is a view depicting a circuit example of an ANT switch unit of the mobile phone according to the second embodiment. The terminal T1 is connected to a gate terminal of the FET switch 14. The terminal T2 is connected to a gate terminal of the FET switch 15. The terminal T3 is connected to a gate terminal of the FET switch 16. A terminal T4 is connected to a gate terminal of the FET switch 17. A terminal T5 is connected to a gate terminal of the FET switch 18. A terminal T6 is connected to a gate terminal of the FET switch 19. The terminals T1 to T6 can be applied with different voltages, respectively. Accordingly, different gate voltages can be applied to the FET switches 14 to 19, respectively.

FIG. 9 is a view of one example of a setting information table of the mobile phone according to the second embodiment. As depicted in FIG. 9, items provided in a setting information table 400 in this embodiment are band, open or closed state, and application voltage. A column for application voltage in the setting information table 400 describes the voltages to be applied to the respective FET switches 14 to 19 for each combination of band information and the open or closed state.

As an example, a case where the transmit signal is Band 1 and the mobile phone is in a closed state will be described. In this case, the corresponding voltages to be applied to the respective FET switches 14 to 19 are V'1(2) to V'6(2). When the transmit signal is Band 1, the FET switch 17 is turned ON since the transmit signal is amplified by the PA 41 and the amplified transmit signal is to be transmitted from the antenna 9. Thus, the voltage V'4(2) is higher than −0.8 V. In this case, the FET switch 17 is ON, and the transmit signal amplified by the PA 41 is transmitted from the antenna 9 via the DUP 21 and the switch 11. The voltages V'1(2), V'2(2), V'3(2), V'5(2), and V'6(2) are determined such that, when applied, the capacitance of the FET switches 14 to 16, 18, and 19 causes the impedance of the antenna 9 and the output impedance of the PA 41 to be matched. In other words, when the load impedance of the transmission path connecting the antenna 9 and the PA 41 is described in a Smith chart, the capacitance of the FET switches 14 to 16, 18, and 19 is determined such that the described load impedance approaches a center portion of the Smith chart. The determined capacitance of the FET switches 14 to 16, 18, and 19 is achieved at the voltages V'1(2), V'2(2), V'3(2), V'5(2), and V'6(2).

Although the setting information table 400 in FIG. 9 describes three sets of setting information, the setting information table 400 in reality describes the setting information in a number of sets according to the band number used and the corresponding open or closed state. Also, although the application voltage has been described for when the transmit signal is Band 1 and the mobile phone is in a closed state, the application voltage is determined in a similar manner also in cases where the band or the open or closed state differs.

Figure 10:
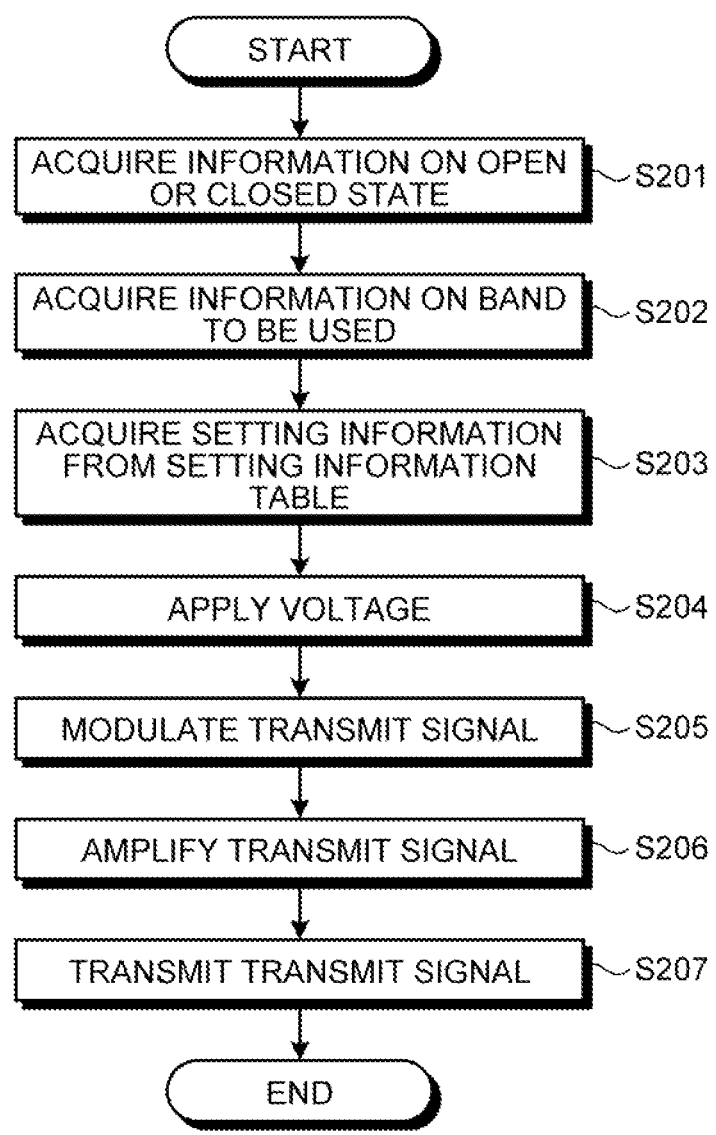
FIG. 10 is a flowchart of a signal transmission process of the mobile phone according to the second embodiment.

Next, referring to FIG. 10, the flow of a signal transmission process of the mobile phone according to this embodiment will be described. FIG. 10 is a flowchart of the signal transmission process of the mobile phone according to the second embodiment.

The control unit 7 acquires information on the open or closed state of the mobile phone detected by the open or close detection unit 8 (step S201).

Next, the control unit 7 acquires information on the band of a signal used as the transmit signal from the BB unit 5 (step S202).

Then, the control unit 7 acquires the setting information which is information on the application voltage of the FET switches 14 to 19 corresponding to the information on the open or closed state and the band information (step S203).

The control unit 7 applies voltages to the FET switches 14 to 19 according to the acquired setting information (step S204).

The BB unit 5 modulates the signal input by an operator (step S205).

The amplifier, among the PAs 41 to 43, corresponding to the band of the transmit signal receives input of the modulated transmit signal from the BB unit 5. Then, the amplifier which has received the input of the transmit signal amplifies the transmit signal (step S206).

Then, the amplified transmit signal is transmitted from the antenna 9 (step S207).

As described above, in the mobile phone according to this embodiment, the FET switch which acts as a capacitor is arranged on the transmission path in addition to the FET switch which acts as a capacitor and arranged between the transmission path and the ground. Accordingly, the FET switch arranged on the transmission path can be used for matching the impedance of the antenna and the output impedance of the PA. Regarding adjustment of the capacitance of the capacitor between the transmission path and the ground, there is a possibility of a matchable range being limited to a capacitive region, thus limiting an adjustable range to an upper half portion in a Smith chart. As such, it may not work when the impedance of the antenna is inductive. However, by adjusting the capacitance of the capacitor on the transmission path, matching can be performed also with respect to an inductive region. That is, by using a wireless terminal device according to this embodiment, matching can be performed with respect to both capacitive and inductive regions. Thus, compared to the case of the first embodiment, the wireless terminal device according to this embodiment can extend a range in which matching can be performed upon a change in impedance of the antenna, so that impedance matching can be performed more appropriately.

[c] Third Embodiment

Figure 11:
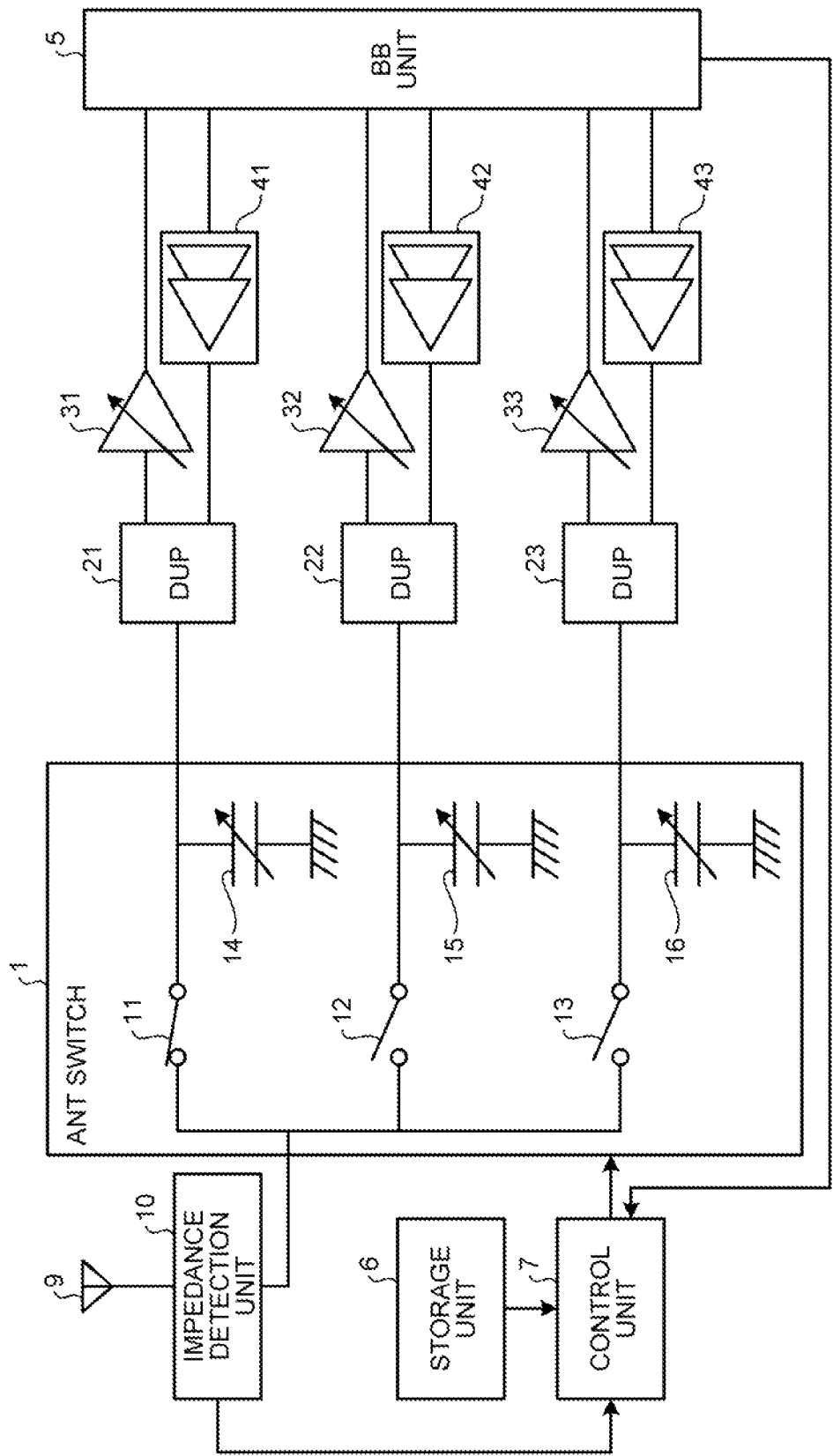
FIG. 11 is a block diagram of a mobile phone according to a third embodiment.

FIG. 11 is a block diagram of a mobile phone according to a third embodiment. The mobile phone according to this embodiment differs from those in the first embodiment and the second embodiment in that a change in impedance of an antenna is acquired and the application voltage is changed according to that change. Thus, the detection of the impedance of the antenna and the adjustment of the application voltage according to the detected impedance will mainly be described below. In FIG. 11, respective portions denoted by the same reference numerals as those in FIG. 1 have the same functions, unless described otherwise. While a case based on the first embodiment is described below, a function of this embodiment may also be added to the second embodiment, in which case a similar effect is obtained.

Figure 12:
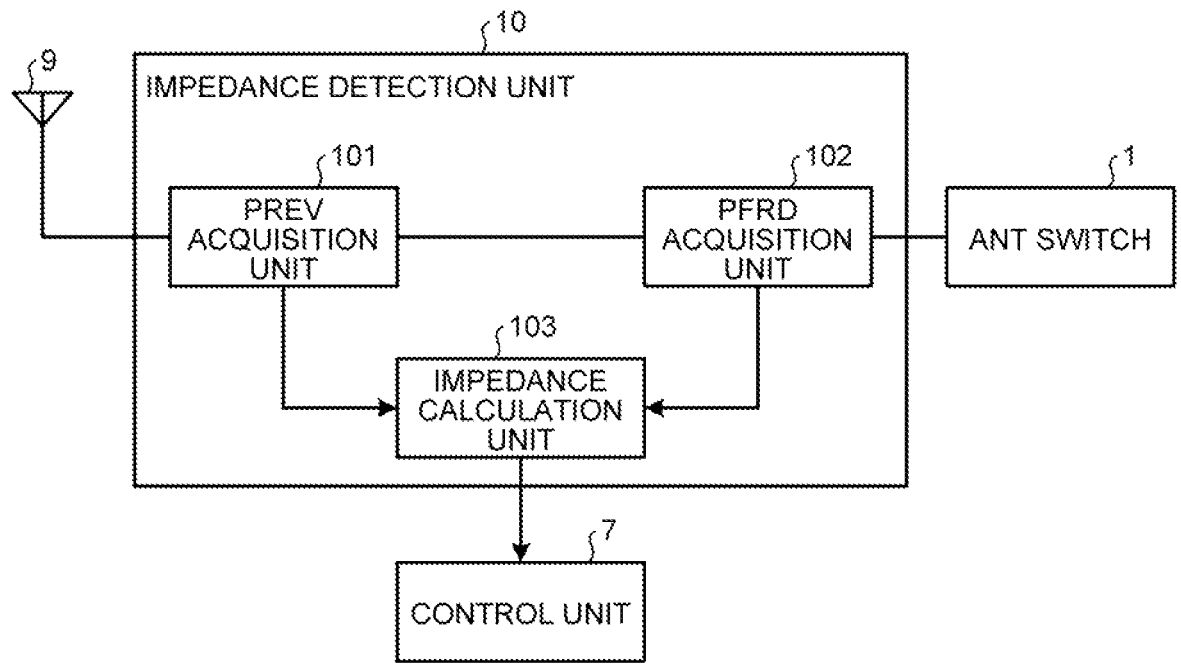
FIG. 12 is a block diagram depicting an impedance detection unit in detail.

In the mobile phone according to this embodiment, an impedance detection unit 10 is arranged between the antenna 9 and the ANT switch 1, as depicted in FIG. 11. Also, in this case, it is not requested to provide the open or close detection unit 8 as in FIG. 1. In this embodiment, a case where the open or close detection unit 8 is not provided is described. FIG. 12 is a block diagram depicting the impedance detection unit in detail.

As depicted as FIG. 12, the impedance detection unit 10 includes a power reverse (PREV) acquisition unit 101, a power forward (PFRD) acquisition unit 102, and an impedance calculation unit 103. The impedance detection unit 10 exemplifies the "impedance acquisition unit."

Due to the influence of the impedance of the antenna 9, a reflected wave is generated. The PREV acquisition unit 101 acquires a reverse power caused by the impedance of the antenna 9. Then, the PREV acquisition unit 101 outputs the acquired reverse power to the impedance calculation unit 103.

The PFRD acquisition unit 102 acquires a forward power directed toward the antenna 9 from the ANT switch 1. Then, the PFRD acquisition unit 102 outputs the acquired forward power to the impedance calculation unit 103.

The impedance calculation unit 103 receives input of the reverse power from the PREV acquisition unit 101. Also, the impedance calculation unit 103 receives input of the forward power from the PFRD acquisition unit 102. Then, the impedance calculation unit 103 calculates the impedance of the antenna 9 by obtaining the ratio of the forward power and the reverse power. Then, the impedance calculation unit 103 outputs the calculated impedance of the antenna 9 to the control unit 7.

The control unit 7 receives input of the impedance of the antenna 9 from the impedance calculation unit 103. Then, according to the received impedance of the antenna 9, the control unit 7 changes the voltage applied to the respective FET switches 14 to 16 to adjust the respective capacitances. Then, the control unit 7 adjusts the capacitance of the FET switches 14 to 16 until the impedance of the antenna 9 input from the impedance calculation unit 103 becomes a predetermined value. In this embodiment, the control unit 7 sets the predetermined value of the impedance of the antenna 9 to 10 dB.

Figure 13:
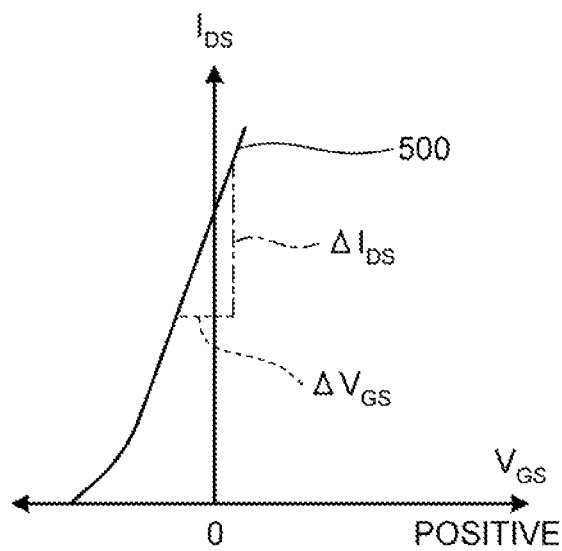
FIG. 13 is a view for illustrating the control of application voltage in relation to the detected impedance of an antenna.

Referring to FIG. 13, an example of the adjustment of the impedance of the antenna 9 by the control unit 7 will be described. FIG. 13 is a view for illustrating the control of application voltage in relation to the detected impedance of the antenna. In FIG. 13, the abscissa describes a gate-source voltage, and the ordinate shows a drain current. A solid line describes a transmission characteristic 500 of the FET switch 14. This transmission characteristic is the same with the FET switches 15 and 16. The impedance of the antenna 9 is $\Delta V_{GS}/\Delta I_{DS}$. For example, a dashed-dotted line describes $\Delta I_{DS}$ corresponding to $\Delta V_{GS}$ described by a dashed line. In this case, the inclination of a hypotenuse of a right triangle formed by the dashed line and the dashed-dotted line describes the impedance of the antenna 9. That is, a smaller inclination of the transmission characteristic 500 indicates a higher impedance of the antenna 9. Also, a greater inclination of the transmission characteristic 500 indicates a lower impedance of the antenna 9. That is, the transmission characteristic 500 describes that the impedance decreases when the voltage is increased.

The control unit 7 stores the transmission characteristic of the FET switches 14 to 16 depicted as FIG. 13. Then, based on the stored transmission characteristic, the control unit 7 determines whether to increase or decrease the voltage of the respective FET switches 14 to 16 so that the received impedance of the antenna 9 becomes 10 dB. Then, the control unit 7 changes the voltage applied to the respective FET switches 14 to 16 to the determined voltage. In this manner, the control unit 7 adjusts the impedance of the antenna 9 to the predetermined value.

Figure 14:
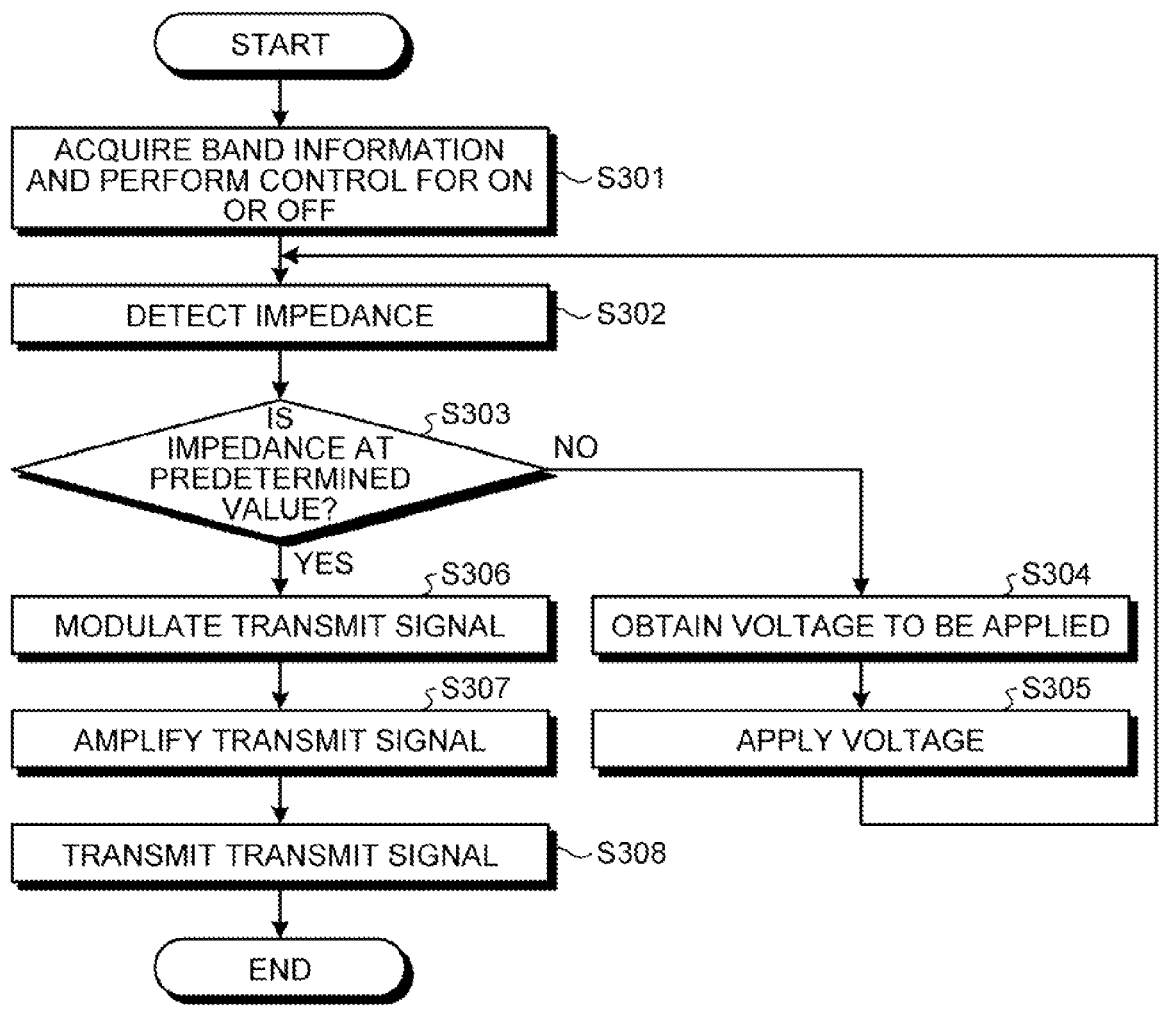
FIG. 14 is a flowchart of a signal transmission process of the mobile phone according to the third embodiment.

Next, referring to FIG. 14, the flow of a signal transmission process of the mobile phone according to this embodiment will be described. FIG. 14 is a flowchart of the signal transmission process of the mobile phone according to the third embodiment.

The control unit 7 acquires band information of a signal used as a transmit signal from the BB unit 5. Then, the control unit 7 controls the switches 11 to 13 to be ON or OFF according to the band information (step S301).

The impedance detection unit 10 detects the impedance of the antenna 9 (step S302).

The control unit 7 receives input of the impedance of the antenna 9 from the impedance detection unit 10. Then, the control unit 7 determines whether or not the received impedance of the antenna 9 is at the predetermined value (step S303).

When the impedance of the antenna 9 is not at the predetermined value (No in step S303), the control unit 7 obtains the application voltage of the FET switches 14 to 16 so that the received impedance of the antenna 9 approaches the predetermined value (step S304).

The control unit 7 applies the obtained application voltage to the respective FET switches 14 to 16 (step S305). Then, the process returns to step S302.

In contrast, when the impedance of the antenna 9 is at the predetermined value (Yes in step S303), the BB unit 5 modulates the signal input by the operator (step S306).

Then, the amplifier, among the PAs 41 to 43, corresponding to the band of the transmit signal receives input of the modulated transmit signal from the BB unit 5. Then, the amplifier which has received the input of the transmit signal amplifies the transmit signal (step S307).

Then, the amplified transmit signal is transmitted from the antenna 9 (step S308).

As described above, the mobile phone according to this embodiment detects the impedance of the antenna, adjusts the capacitance of the FET switch based on the detected impedance, and matches the antenna impedance and the output impedance of the PA. Accordingly, a wireless terminal device according to this embodiment can match the antenna impedance and the output impedance of the PA more appropriately compared to the cases of the first embodiment and the second embodiment. Also, with the wireless terminal device according to this embodiment, the antenna impedance and the output impedance of the PA can be matched appropriately under any change in the impedance of the antenna.

Although a case where three bands are used has been described in the respective embodiments above, the number of bands is not particularly limited.

According to one aspect of the disclosure, a wireless terminal device of the present application has an effect that the number of parts can be reduced without having to decrease power efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal device comprising:
   a first casing including an antenna;
   a second casing movably connected to the first casing;

a baseband processing unit that generates a transmit signal;
a plurality of amplifiers that amplify the transmit signal;
a first switch provided on each transmission path connecting the antenna and each of the amplifiers;
a second switch provided between the transmission path and a ground, where the second switch is turned ON when a first predetermined voltage is applied, is turned OFF when a second predetermined voltage is applied, and, when an intermediate voltage between the first predetermined voltage and the second predetermined voltage is applied, has a capacitance according to the applied intermediate voltage;
an impedance acquisition unit that acquires an impedance of the antenna corresponding to a positional relationship of the first casing and the second casing; and
a control unit that turns ON one of the first switches based on a frequency band of the transmit signal and applies the intermediate voltage to at least one of the second switches to match an impedance of the amplifier arranged on the transmission path where the first switch is turned ON and the impedance of the antenna based on the impedance of the antenna acquired by the impedance acquisition unit.

2. The wireless terminal device according to claim 1, wherein the impedance acquisition unit includes a sensor that detects a positional relationship of the first casing and the second casing and acquires the impedance of the antenna according to the detected positional relationship.

3. The wireless terminal device according to claim 1, wherein the control unit stores a table describing a combination of voltages, corresponding to the impedance of the antenna, to be applied to the respective second switches and refers to the table based on the impedance of the antenna to determine the voltage to be applied to the second switch.

4. The wireless terminal device according to claim 1, wherein
the impedance acquisition unit detects the impedance of the antenna based on a reflected wave from the antenna and a forward wave toward the antenna; and
the control unit controls the capacitance of the second switch so that the impedance of the antenna detected by the impedance acquisition unit becomes a predetermined value.

5. The wireless terminal device according to any one of claim 1, wherein
the first switch is turned ON when the first predetermined voltage is applied, is turned OFF when the second predetermined voltage is applied, and, when the intermediate voltage between the first predetermined voltage and the second predetermined voltage is applied, has a capacitance according to the applied intermediate voltage; and
the control unit applies the first predetermined voltage to one of the first switches based on the frequency band of the transmit signal and the impedance of the antenna, and applies the intermediate voltage to the remaining respective first switch and the respective second switches to achieve a capacitance whereby the impedance of the amplifier arranged on the transmission path where the first switch is ON and the impedance of the antenna are matched based on the impedance of the antenna acquired by the impedance acquisition unit.

6. A wireless terminal device comprising:
a first casing including an antenna;
a second casing movably connected to the first casing;
a plurality of amplifiers that amplify a transmit signal;
a first switch provided on each transmission path connecting the antenna and each of the amplifiers;
a second switch provided between the transmission path and a ground, where the second switch is turned ON when a first predetermined voltage is applied, is turned OFF when a second predetermined voltage is applied, and, when an intermediate voltage between the first predetermined voltage and the second predetermined voltage is applied, has a capacitance according to the applied intermediate voltage; and
a processor, wherein the processor execute:
generating the transmit signal;
acquiring an impedance of the antenna corresponding to a positional relationship of the first casing and the second casing;
turning ON one of the first switches based on a frequency band of the transmit signal; and
applying the intermediate voltage to at least one of the second switches to match an impedance of the amplifier arranged on the transmission path where the first switch is turned ON and the impedance of the antenna based on the impedance of the antenna acquired.

* * * * *